United States Patent [19]

Nomura et al.

[11] 4,310,317

[45] Jan. 12, 1982

[54] EDUCATIONAL APPARATUS WITH AUTOMATIC TERMINAL IDENTIFICATION

[75] Inventors: Shigenori Nomura, Mitaka; Tetsuzo Kano, Yokohama, both of Japan

[73] Assignee: Sony Corporation, Tokyo, Japan

[21] Appl. No.: 77,282

[22] Filed: Sep. 20, 1979

[30] Foreign Application Priority Data

Sep. 27, 1978 [JP] Japan .............................. 53-117847
Sep. 27, 1978 [JP] Japan .............................. 53-131631

[51] Int. Cl.³ .............................................. G09B 5/04
[52] U.S. Cl. ............................ 434/319; 179/1 MN; 434/157; 434/350
[58] Field of Search ............... 434/350, 351, 157, 319, 434/320, 321; 179/1 H, 1 MN

[56] References Cited

U.S. PATENT DOCUMENTS 3,069,789 12/1962 Knight et al. .................... 434/320 X
4,048,729 9/1977 Derks ................................. 434/320

Primary Examiner—William H. Grieb
Attorney, Agent, or Firm—Lewis H. Eslinger; Alvin Sinderbrand

[57] ABSTRACT

An educational apparatus, of the language laboratory type, includes a master control unit operated by the teacher and which is associated with a plurality of student terminal control units so that the teacher can monitor the student's responses and immediately answer any questions by the students. Each terminal control unit includes any information signal input for receiving an information signal, such as a question from a student, an information signal transmitting circuit adapted to receive the information signal from the respective input and to transmit the same to a monitoring device, such as a headphone set, at the master control unit and a call signal input for supplying a call signal, as when a student has a question, to the respective transmitting circuit and also to a respective indicating device, such as a light emitting diode, at the master control unit, for indicating that a student has a question. The master control unit includes an incoming call switch for making operative the respective transmitting circuit when a call signal is supplied thereto, whereby to pass the respective information signal through the operated transmitting circuit to the monitoring device of the master control unit. The educational apparatus also includes a mobile control unit for controlling the operation of the master control unit, in the same manner as described above, while the teacher walks among and observes the students.

9 Claims, 4 Drawing Figures

EDUCATIONAL APPARATUS WITH AUTOMATIC TERMINAL IDENTIFICATION

BACKGROUND OF THE INVENTION

1. Field of the Invention

This invention relates to an educational apparatus and, more particularly, is directed to an educational apparatus of the language laboratory type having a master console which is associated with a plurality of student terminals.

2. Description of the Prior Art

With known educational apparatus of the above type, a teacher must spend much time during a lesson in the operation of the apparatus, making it difficult to provide any effective communication between the teacher and the students. This is especially the case in known apparatus of the language laboratory type which requires continual observation of a master control console by the teacher during the entire lesson. This is due to the fact that, during the lesson, the teacher monitors the exercises of the students, and answers questions from and advises the students.

In known language laboratory apparatus, a sequential scanning means is typically provided which is capable of automatically carrying out sequential monitoring of the students, and which scans all student terminals sequentially in the forward or reverse directions. Such systems usually also enable manual scanning of particular terminals through an added control circuit.

Although the aforesaid educational apparatus enables automatic sequential monitoring, there are certain disadvantages associated therewith. For example, the master console typically includes an indication device, such as a lamp, which is adapted to blink on and off in response to the depression of a control button at any one of the student terminals for informing the teacher that a student has a question about the lesson. However, since only one lamp is typically provided, the teacher does not known which student is calling and consequently, must spend much time and effort determining this before responding to the call. Alternatively, some master consoles are provided with a plurality of lamps, each associated with a respective student terminal. In this case, however, the teacher must continually monitor the lamps, making it difficult to provide any effective supervision over the lesson.

Further, it is generally desirable for the teacher to observe the students during the lesson, while also monitoring their responses. Since the teacher cannot watch the call lamps while walking among the students, it is necessary for an operator to remain at the master console to call the teacher back when there is a call from a student. In addition, a monitoring jack may be provided at each student terminal so that the teacher can plug in a headphone set thereat while walking among the students in order to monitor the responses of the students. This system, however, has serious drawbacks in that it is difficult to proceed with the lesson because the students are aware of the monitoring by the teacher.

OBJECTS AND SUMMARY OF THE INVENTION

Accordingly, it is an object of this invention to provide an educational apparatus that avoids the above-described difficulties encountered with known educational apparatus.

More particularly, it is an object of this invention to provide an educational apparatus which informs the teacher when a student has a question and enables the teacher to instantly communicate with that student for responding to the question.

It is another object of this invention to provide an educational apparatus which does not require continual monitoring of a plurality of indicating devices by the teacher to determine when a student has a question.

It is still another object of this invention to provide an educational apparatus in which the teacher, while walking among the students, can be informed of a call from a student and instantly communicate with that student in response to the call.

In accordance with an aspect of this invention, an educational apparatus includes a plurality of terminal control means each including information signal input means, information signal transmitting means for receiving an information signal from the respective input means, and call signal input means operative to provide a call signal by which the respective transmitting means is conditioned to be made operative for transmitting the information signal received from the respective input means. The educational apparatus further includes master control means including indicating means for indicating when a call signal is received from the call signal input means of any of the terminal control means, monitoring means for monitoring the information signal from any one of the terminal control means, and incoming call switch means actuable to cause operation of the transmitting means of the one of the terminal control means which has had its call signal input means operated to provide the call signal, whereby to pass the information signal through the operated transmitting means to the monitoring means.

In a preferred embodiment, the educational apparatus also includes a mobile control means through which the teacher can control the operation of the master control means while walking among the students.

The above, and other objects, features and advantages of the invention, will be apparent in the following detailed description of preferred embodiments which is to be read in connection with the accompanying drawings.

DESCRIPTION OF THE PREFERRED EMBODIMENTS

Figure 1:
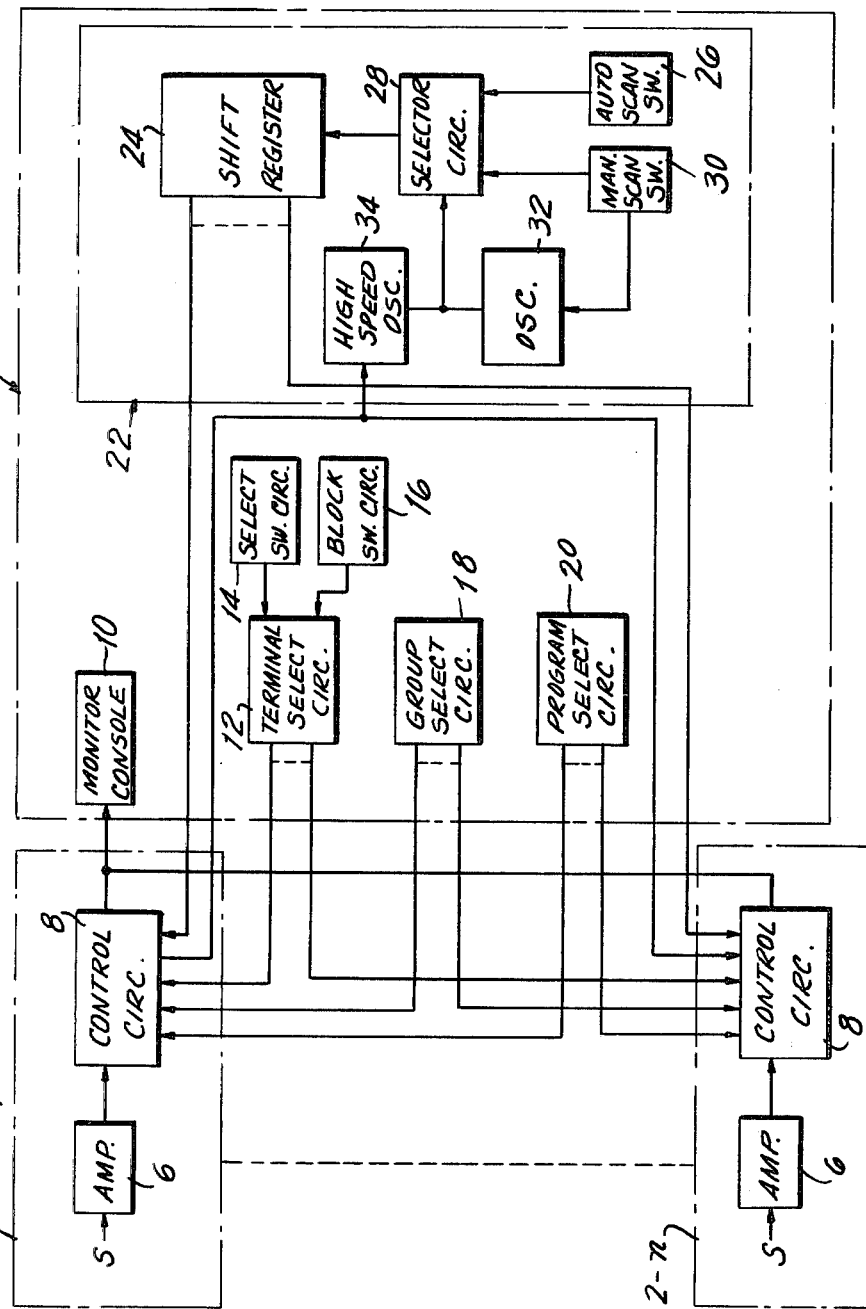
FIG. 1 is a block diagram of a known educational apparatus.

Referring to the drawings in detail, and initially to FIG. 1, there is shown therein a known educational apparatus, such as an audio language laboratory, in which a student listens to a phrase from a tape, for example, in a foreign language, and then either repeats the phrase or supplies an answer thereto. In order for the teacher to observe the progress of any student, a monitoring system is provided which sequentially monitors the students' responses and transmits the same to a master console. At this time, it should be recognized that, although the following discussion is primarily directed to an audio educational apparatus, any other sensory operation may be utilized which is capable of performing an educational function.

As shown in FIG. 1, the language laboratory is comprised of a plurality of student terminal control units 2, for example, as indicated at 2-1-2-n, and a master control unit 4 connected to and adapted to control the operation of each terminal control unit 2. Each terminal control unit 2 includes an amplifier 6 which receives and amplifies an audio information signal S from the student, and a control circuit 8 connected to amplifier 6 and adapted to transmit the amplified information signal to master control unit 4.

Master control unit 4 is operated by the teacher and includes a monitor console 10 adapted to receive the amplified information signals from selective ones of terminal control units 8 so that the teacher can observe the progress of each student. In this regard, master control unit 4 includes a terminal selection circuit 12 for selecting particular terminal control units 2 which are to be sequentially monitored by the teacher. Selection circuit 12 is connected to each control circuit 8 for controlling the transmission therefrom of the amplified information signals to monitor console 10. A selection switch circuit 14 is connected to terminal selection circuit 12 in order to allow passage of the amplified information signals to monitor console 10 from only a preselected number of terminal control units 2. In like manner, a blocking switch circuit 16 is connected to terminal selection circuit 12 for allowing transmission of the amplified information signals to monitor console 10 from the remaining blocked terminal control units 2 that were not preselected. Also, where the terminal control units 2 are divided into groups, that is, for different student levels or the like, a group selection circuit 18 is connected to each control circuit 8 to allow transmission of the amplified information signals from a preselected group. A program selection circuit 20 is also connected to each control circuit 8 so that the teacher is able to monitor only those terminal control units 2 that are implementing the same language program.

Master control unit 4 further includes a scanning circuit 22 for sequentially scanning terminal control units 8 that have been preselected by circuits 12, 18 and 20. Scanning circuit 22 includes a shift register 24 connected to each control circuit 8, and an automatic scan switch circuit 26 is connected to shift register 24 through a selector circuit 28 for actuating shift register 24 to sequentially scan, in the reverse or forward direction, the preselected terminal control units 2. A manual scan switch circuit 30 is connected directly, and through an oscillator 32, to selector circuit 28. Oscillator 32 normally supplies an output signal to selector circuit 28 when automatic scan switch circuit 26 is actuated. When manual scan switch circuit 30 is actuated, for example, by the depression of a momentary contact, push-button switch (not shown), the output of oscillator 32 is momentarily suspended and a sequential scanning signal is supplied from selector circuit 28 to shift register 24 to enable scanning of the terminal control unit 2 succeeding the one presently being scanned. If the push button is retained in a depressed condition, shift register 24 is caused to sequentially scan terminal control units 2 at a faster rate than normally occurs under the control of automatic scan switch circuit 26. Thus, the teacher is able to observe the progress of any student when desired. If a terminal control unit 2 being scanned is blocked, that is, not preselected, a high-speed oscillator 34 is driven by the output of the control circuit 8 of the scanned terminal control unit to supply a high-speed pulse to selector circuit 28 for bypassing, at a rapid rate, that terminal control unit 2.

Although the aforesaid educational apparatus enables automatic sequential monitoring, there are certain disadvantages associated therewith. For example, master control unit 4 typically includes an indication device (not shown), such as a lamp, which is adapted to blink on and off in response to the depression of a control button at each student's terminal for informing the teacher that a student has a question about the lesson. However, since only one lamp is typically provided, the teacher does not known which student is calling and consequently, must spend much time and effort determining this before being able to respond to the call. Alternatively, some master control units are provided with a plurality of lamps, each associated with a respective student terminal. In this case, however, the teacher must continually monitor the lamps, making it difficult to provide any effective supervision over the lesson.

Further, it is generally desirable for the teacher to observe the students during the lesson, while also monitoring their responses. Since the teacher cannot watch the call lamps while walking among the students, it is necessary for an operator to remain at the master control unit to call the teacher back when there is a call from a student. Alternatively, a monitoring jack may be provided at each terminal control unit so that the teacher can plug in a headphone set thereat while walking among the students in order to monitor the responses of the students. This system, however, has serious drawbacks in that it is difficult to proceed with the lesson because the students are aware of the monitoring by the teacher.

Figure 2:
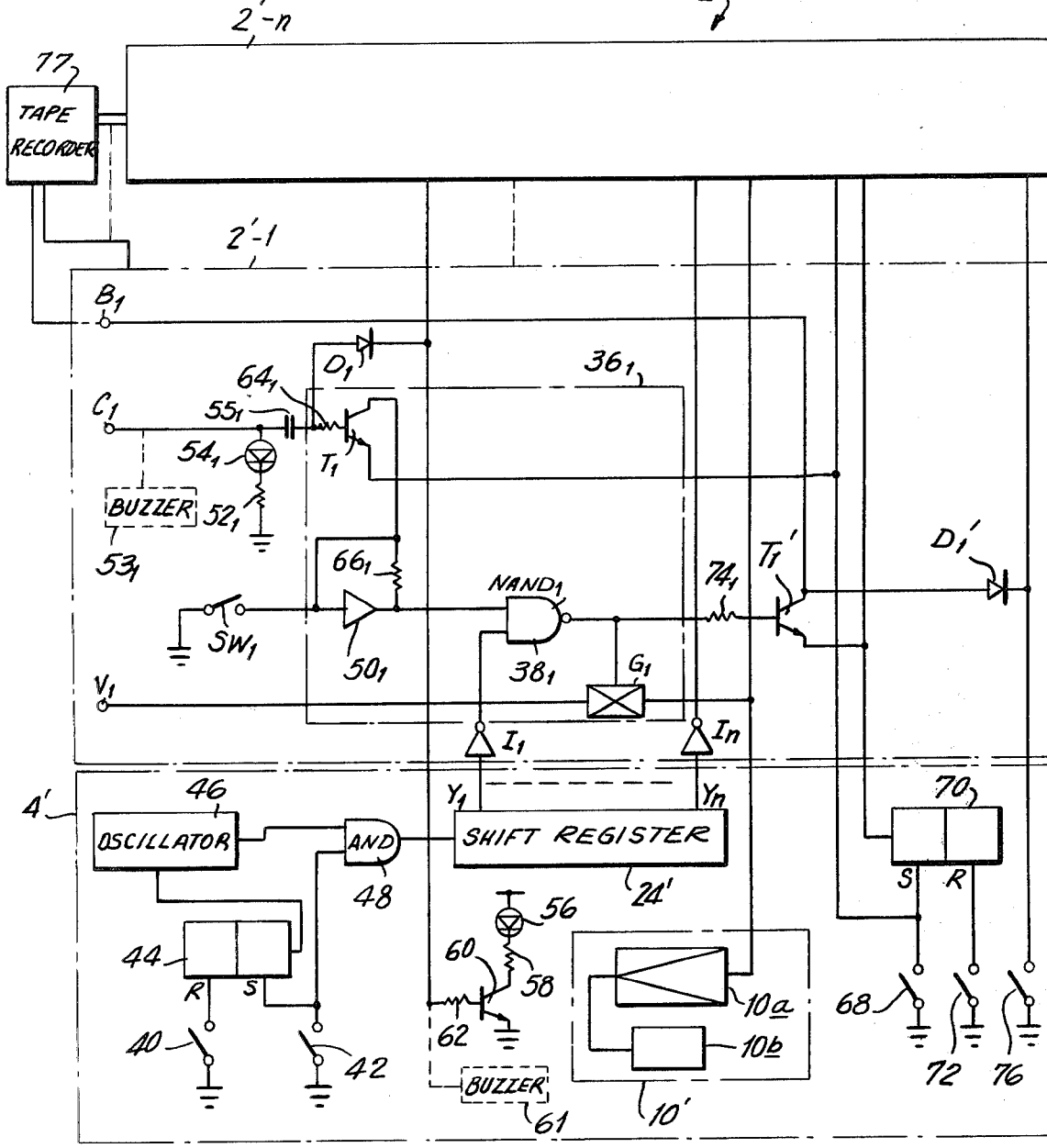
FIG. 2 is a block diagram of one embodiment of an educational apparatus according to this invention.

Referring now to FIG. 2, it will be seen that, in one embodiment of an educational apparatus according to this invention, elements corresponding to those described above with reference to the known educational apparatus of FIG. 1 are identified by the same reference numerals with primes appended thereto. Thus, in the educational apparatus of FIG. 2, a master control unit 4' is connected to and controls the operation of a plurality of student terminal control units 2'-1-2'-n.

The following discussion will be directed to the relation between master control unit 4' and terminal control unit 2'-1, although it is to be realized that the same relation exists between master control unit 4' and all the other terminal control units 2'-1-2'-n which are similar to each other. Terminal control unit 2'-1 is shown to include an information signal input terminal $V_1$ which is supplied with the amplified information signal from an amplifier (not shown). The information signal may be, for example, a question by the student or merely the student's response to the lesson. The information signal is supplied in unit 2'-1 to an information signal transmitting circuit $36_1$, which is adapted to transmit the signal to monitor console 10' of master control unit 4'. Monitor console 10' is shown to include an amplifier 10a and an electro-audio transducer 10b, such as, a headphone set or the like. As shown, transmitting circuit $36_1$ may include a gate $G_1$ which is connected between input terminal $V_1$ and monitor console 10' and which is adapted to transmit the information signal when a logic level "1" signal is supplied to its control input. Gate $G_1$ has its control input connected to the output of a NAND circuit $38_1$ of transmitting circuit $36_1$. Thus, when a logic level "1" signal is produced by NAND circuit $38_1$, that is, when a logic level "0" signal is supplied to any input thereof, the information signal from terminal $V_1$ is transmitted to monitor console $10'$.

NAND circuit $38_1$ has one of its inputs connected, through an inverter $I_1$, to a shift register $24'$ of master control unit $4'$. When the output $Y_1$ from shift register $24'$ is at logic level "1," one input to NAND circuit $38_1$ is at logic level "0" and the information signal from terminal $V_1$ is transmitted to monitor console $10'$.

Master control unit $4'$ includes an automatic scan switch 40 and a manual scan switch 42 which are connected between ground and the reset and set terminals, respectively, of a flip-flop circuit 44. An oscillator 46 is connected to the output of flip-flop circuit 44 and to shift register $24'$ through an AND circuit 48. Manual scan switch 42 is also connected between another input of AND circuit 48 and ground. When automatic scan switch 40 is closed, oscillator 46 produces sequential pulses which are applied to shift register $24'$ through AND circuit 48 for causing master control unit $4'$ to sequentially scan terminal control units $2'$. However, at this time, shift register $24'$ only produces a logic level "0" output which, when inverted by inverter $I_1$, is supplied to NAND circuit $38_1$ as a logic level "1" signal. Thus, unless the other input to NAND circuit $38_1$ is at logic level "0," no transmission of the amplified information signal from terminal $V_1$ occurs.

On the other hand, when manual scan switch 42 is closed, flip-flop 44 is set, stopping oscillator 46 from producing an output signal. The outputs of AND circuit 48 and shift register $24'$ are then at logic level "1" and a logic level "0" signal is supplied to an input of NAND circuit $38_1$. This means that, regardless of the signal applied to the other input of NAND circuit $38_1$, a logic level "1" signal is supplied to gate $G_1$ to allow transmission of the amplified information signal from terminal $V_1$ to monitor console $10'$. The teacher can thus monitor any student's terminal in the same manner as the apparatus of FIG. 1.

Terminal control unit $2'$-1 also includes a monitor switch $SW_1$, connected between ground and the other input of NAND circuit $38_1$, through a non-inverting amplifier $50_1$. When switch $SW_1$ is open, a logic level "1" signal is supplied to NAND circuit $38_1$, and when closed, a logic level "0" signal is supplied thereto to enable transmission of the amplified information signal to monitor console $10'$. This enables the teacher to listen to, for example, the entire class if all monitor switches $SW_1$-$SW_n$ are closed, although normally, such switches are retained in an open position.

Terminal control unit $2'$-1 is provided with a call signal input terminal $C_1$ which is supplied with a call signal when a call switch (not shown) is closed by the student, for example, when the student has a question concerning the lesson. A student indicating device is connected between terminal $C_1$ and ground for indicating when the respective call switch has been closed, and is comprised of a resistor $52_1$ and a light emitting diode (LED) $54_1$, although any other indicating device, such as an audible buzzer $53_1$, can be utilized. A similar indicating device is provided on master control unit $4'$. This latter indicating device is connected to terminal $C_1$ through a capacitor $55_1$ and a diode $D_1$ and is comprised of a light emitting diode (LED) 56 and resistor 58 connected, in series, to the collector of a transistor 60, which has its emitter connected to ground and its base connected to diode $D_1$ through an input resistor 62. In like manner, an audible buzzer 61 may be provided at master control unit $4'$. Thus, when the student has a question and closes the respective call switch, LEDs $54_1$ and 56 are activated so as to blink on and off. In this manner, the teacher is informed that a student has a question, although the identity of the student is still unknown.

As shown in FIG. 2, information signal transmitting circuit $36_1$ also includes a transistor $T_1$ which has its base connected to terminal $C_1$ through a resistor $64_1$ and capacitor $55_1$. The collector of transistor $T_1$ is connected to one input of NAND circuit $38_1$ through a resistor $66_1$ and through amplifier $50_1$, and transistor $T_1$ has its emitter connected to ground through an incoming call switch 68 at master control unit $4'$. When no call signal is supplied to terminal $C_1$, light emitting diodes $54_1$ and 56 and transistor $T_1$ are in their OFF states, so that a logic level "1" signal is supplied to NAND circuit $38_1$ from transistor $T_1$. When a call signal is supplied to terminal $C_1$, diode 56 blinks on and off, indicating to the teacher that a student has a question. However, transistor $T_1$ is still retained in its OFF state until incoming call switch 68 is closed by the teacher, completing the circuit for transistor $T_1$. Once this switch is closed, transistor $T_1$ turns ON and a logic level "0" signal is supplied to NAND circuit $38_1$. This permits transmission of the information input signal, in the form of a question from the student, to monitor console $10'$. Thus, the teacher is then able to instantly determine which student is asking the question and can respond to it.

Call incoming switch 68 is also connected to the set terminal of a flip-flop circuit 70 of master control unit $4'$. A reset switch 72 is connected between the reset terminal of flip-flop circuit 70 and ground. The output of flip-flop circuit 70 is connected to the emitter terminal of a transistor $T_1'$, which has its base connected to the output of NAND circuit $38_1$ through a resistor $74_1$, and its collector connected to a break-in or interrupt terminal $B_1$ of terminal control unit $2'$-1. When a logic level "1" signal is supplied to transistor $T_1'$ from NAND circuit $38_1$, and call incoming switch 68 is closed to receive the question by the student, transistor $T_1'$ is in its ON state (with its emitter grounded through flip-flop 70) so as to supply an output logic level "0" signal to break-in terminal $B_1$ which, for example, controls the output of a tape recorder 77 in respect to that student. For example, the output of tape recorder 77 to terminal control unit $2'$-1 may be interrupted in response to the logic level "0" at terminal $B_1$ so that the teacher and student may freely communicate with each other without any disturbance from the lesson tape. When the communication with the student is at an end, reset switch 72 is closed to reset flip-flop to its original state, resulting in the output of tape recorder 77 once again being supplied to terminal control unit $2'$-1.

Master control unit $4'$ also includes an interrupt switch 76 which is connected to ground and to the collectors of transistors $T_1'$-$T_n'$ through respective diodes $D_1'$-$D_n'$ of terminal control units $2'$-1-$2'$-n. Thus, when desired, the teacher can interrupt the output of tape recorder 77 to all terminal control units $2'$-1-$2'$-n.

It can readily be seen from the above discussion that only one light emitting device 56 is required to inform the teacher that a student has a question, although the identity of the student is unknown at that time. Further, by merely closing switch 68, the teacher is immediately placed in communication with that student and can respond to the question without incurring any great effort in determining the student's identity beforehand.

Figure 3:
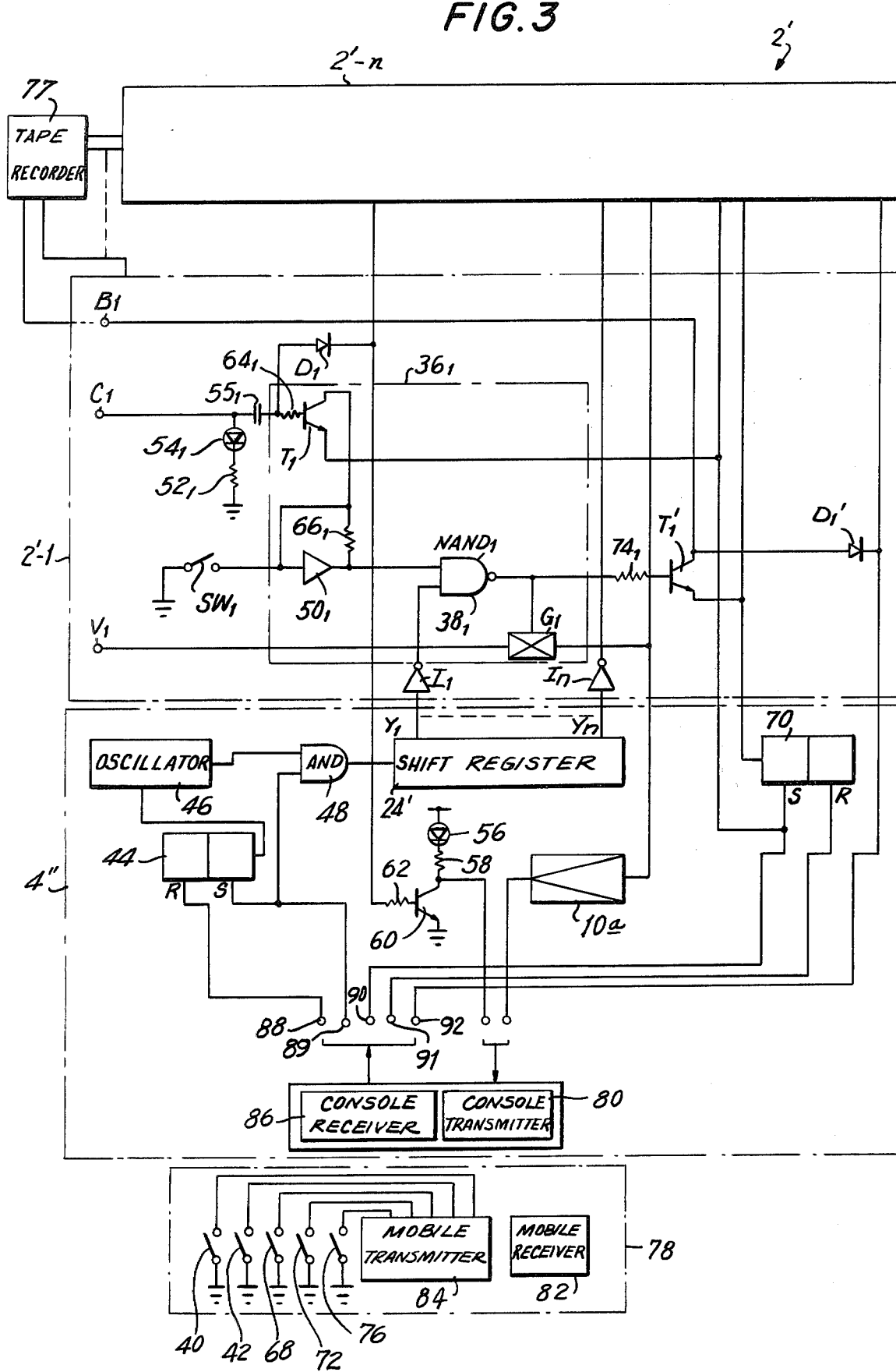
FIG. 3 is a block diagram of another embodiment of an educational apparatus according to this invention.

Referring now to FIG. 3, there is shown a second embodiment of this invention, in which elements corresponding to those described above with reference to the embodiment of FIG. 2, are identified by the same reference numerals and operate in the same manner. In the embodiment of FIG. 3, a mobile control unit 78 is adapted to communicate with, and control master control unit 4" while the teacher is walking among and observing the students. In this regard, master control unit 4" includes a console transmitter 80 which is adapted to receive an indicating signal from transistor 60 and an amplified information signal from amplifier 10a and transmit the same to a corresponding mobile receiver 82 of mobile control unit 78. Thus, when an incoming call signal is supplied to terminal $C_1$, a buzzer (not shown) on mobile control unit 78 can be activated to inform the teacher that a student has a question. In like manner, mobile control unit 78 includes a mobile transmitter 84 which is adapted to transmit appropriate signals to a corresponding console receiver 86 of master control unit 4". Mobile transmitter 84 is shown to have switches 40, 42, 68, 72 and 76 associated therewith and which correspond to respective terminals 88-92 of console receiver 86. It will be appreciated that switches 40, 42, 68, 72 and 76 associated with mobile transmitter 84 operate in the same manner as the correspondingly numbered switches in the embodiment of FIG. 2.

Figure 4:
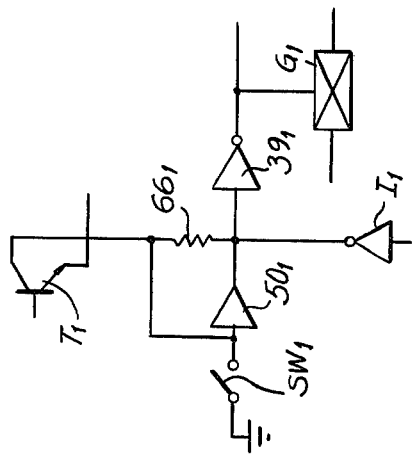
FIG. 4 is a fragmentary block diagram showing a modification of the apparatus according to this invention.

As shown on FIG. 4, the NAND circuit $38_1$ in the embodiment of FIG. 2 or FIG. 3 can be replaced by an inverter circuit $39_1$, with the signals from inverter $I_1$, transistor $T_1$, and switch $SW_1$ all being applied to one input of inverter $39_1$. Thus, when an output signal from any one of these elements $I_1$, $T_1$, and $SW_1$ is at a logic level "0," gate $G_1$ would have supplied thereto the necessary logic level "1" signal for transmission of the amplified information signal.

Having described specific preferred embodiments of the invention with reference to the accompanying drawings, it is to be understood that the invention is not limited to those precise embodiments, and that various changes and modifications in addition to those specified above may be effected therein by one skilled in the art without departing from the scope or the spirit of the invention as defined in the appended claims.

What is claimed is:

1. An educational apparatus comprising:
a plurality of terminal control means each including
information signal input means,
information signal transmitting means for receiving an information signal from the respective input means, each said information signal transmitting means including gate means having a controllable input and being adapted to pass the respective information signal to monitoring means, a logic level device having at least one input and which supplies an output signal to said controllable input of said respective gate means for controlling the passage of said respective information signal to said monitoring means, and a semiconductor device having an input supplied with a respective call signal and an output circuit adapted to supply an output signal to said respective logic level device for actuating said gate means to pass the respective information signal to said monitoring means, and
call signal input means operative to provide said call signal by which the respective transmitting means is conditioned to be made operative for transmitting the information signal received from the respective input means; and
master control means including
indicating means for indicating when a call signal is provided by said call signal input means of any of said terminal control means,
monitoring means as aforementioned for monitoring said information signal from any one of said terminal control means, and
incoming call switch means actuable to cause operation of the transmitting means of the one of said terminal control means which has had its call signal input means operated to provide said call signal, whereby to pass the information signal through the operated transmitting means to said monitoring means.

2. An educational apparatus according to claim 1; in which each said semiconductor device is a bi-polar junction transistor having its base supplied with said respective call signal and its collector adapted to supply said output signal to said respective logic level device.

3. An educational apparatus according to claim 1; in which said incoming call switch means includes a switching device connected to said output circuit of each of the semiconductor devices and which is actuable to cause each said semiconductor device to supply output signal thereof to said respective logic level device when said respective call signal is supplied thereto.

4. An educational apparatus according to claim 3; in which each said semiconductor device is a bi-polar junction transistor having its base supplied with said respective call signal, its emitter connected to said incoming call switch means and its collector adapted to supply said output signal thereof to said respective logic level device.

5. An educational apparatus comprising:
recorder means for supplying a recorded output signal to each of a plurality of terminal control means;
a plurality of terminal control means each including
information signal input means,
information signal transmitting means for receiving an information signal from the respective input means, in which each said transmitting means produces an output signal during operation thereof,
call signal input means operative to provide a call signal by which the respective transmitting means is conditioned to be made operative for transmitting the information signal received from the respective input means, and
means for interrupting the supply of said recorded output signal to the respective terminal control means, in which each said respective means for interrupting includes a semiconductor device responsive to said output signal from said respective transmitting means for interrupting the supply of said recorded output signal to said respective terminal control means; and
master control means including
indicating means for indicating when a call signal is provided by said call signal input means of any of said terminal control means,
monitoring means for monitoring said information signal from any one of said terminal control means, and
incoming call switch means actuable to cause operation of the transmitting means of the one of said terminal control means which has had its call signal input means operated to provide said call signal, whereby to pass the information signal through the operated transmitting means to said monitoring means.

6. An educational apparatus according to claim 5; in which each said semiconductor device is a bi-polar junction transistor having its base supplied with said output signal from said respective transmitting means, its emitter connected to said incoming call switch means and its collector producing an output signal for interrupting the supply of said recorded output signal to said respective terminal control means.

7. An educational apparatus comprising:

a plurality of terminal control means each including information signal input means, information signal transmitting means for receiving an information signal from the respective input means, and call signal input means operative to provide a call signal by which the respective transmitting means is conditioned to be made operative for transmitting the information signal received from the respective input means; and master control means including indicating means for indicating when a call signal is provided by said call signal input means of any of said terminal control means, monitoring means for monitoring said information signal from any one of said terminal control means, incoming call switch means actuable to cause operation of the transmitting means of the one of said terminal control means which has had its call signal input means operated to provide said call signal, whereby to pass the information signal through the operated transmitting means to said monitoring means, and means for automatically scanning said respective terminal control means, said means for automatically scanning including a shift register for sequentially providing an automatic scan signal to each said transmitting means, oscillator means adapted to provide an oscillation signal to said shift register and automatic scan switch means adapted to actuate said oscillator means to provide said oscillation signal to said shift register.

8. An educational apparatus according to claim 7; in which said automatic scan switch means includes an actuable switch and a flip-flop circuit connected between said actuable switch and said oscillator means.

9. An educational apparatus according to claim 7; in which said master control means further includes manual scan switch means for preventing said oscillator means from providing an oscillation signal to said shift register.

* * * * *